C. O. WYMAN.
CHAIN.
APPLICATION FILED OCT. 16, 1905.

No. 907,548.

Patented Dec. 22, 1908.

WITNESSES

INVENTOR
CHARLES O. WYMAN
BY
Paul & Paul
HIS ATTORNEYS

UNITED STATES PATENT OFFICE.

CHARLES O. WYMAN, OF ANOKA, MINNESOTA.

CHAIN.

No. 907,548.  Specification of Letters Patent.  Patented Dec. 22, 1908.

Application filed October 16, 1905. Serial No. 282,925.

*To all whom it may concern:*

Be it known that I, CHARLES O. WYMAN, of Anoka, Anoka county, Minnesota, have invented certain new and useful Improvements in Chains, of which the following is a specification.

My invention relates to chains used for transmitting power, and the object of my invention is to provide a chain which can be utilized to transmit power when the carrying wheels are not in the same plane, being arranged obliquely with respect to one another, or substantially at right angles.

A further object is to provide a chain which will be simple, economical of construction, and very strong and durable.

Other objects of the invention will appear from the following detailed description.

The invention consists generally in a chain composed of box like skeleton links having openings on each of their four sides or faces to receive the teeth of a sprocket wheel and an eye or loop at one end and a hook at the other end.

Further, the invention consists in providing a swiveled eye or loop whereby the frame or main portion of the link is allowed to revolve and adapt itself to the surface over which the chain is passing.

Further, the invention consists in various constructions and combinations, all as hereinafter described and particularly pointed out in the claims.

Figure 1:
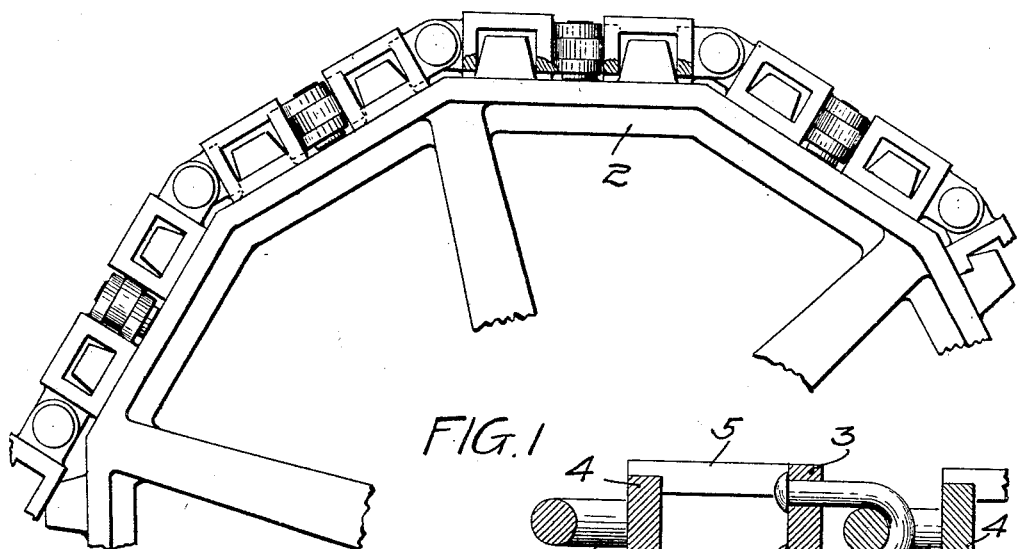
Figure 2:
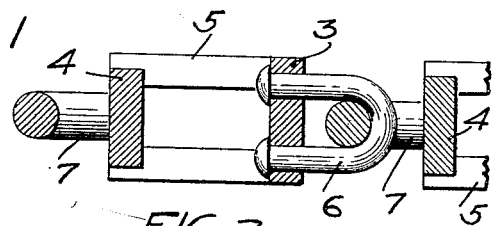
Figure 3:
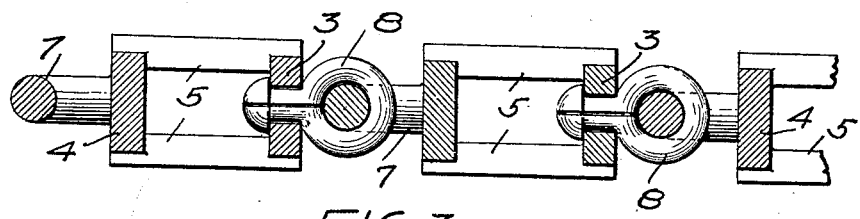
Figure 4:
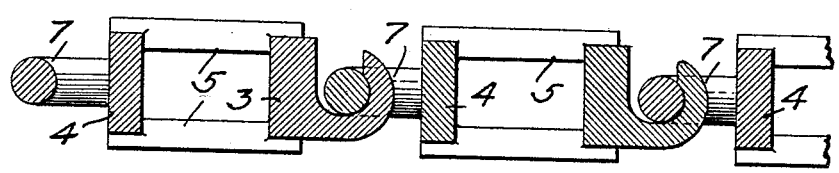
Figure 5:
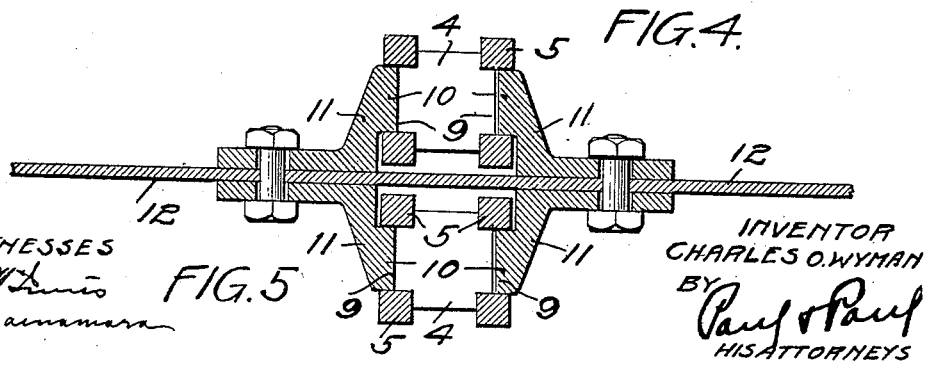

In the accompanying drawings forming part of this specification, Figure 1 is a side elevation of a portion of a sprocket wheel showing my improved chain passing thereover. Fig. 2 is a detail sectional view illustrating a modified construction of chain.
Fig. 3 is a similar view showing another modification. Fig. 4 is a sectional view illustrating still another modification in construction. Fig. 5 is a sectional view illustrating the chain in use.

In the drawing, 2 represents a sprocket wheel having a periphery particularly adapted for my improved type of chain. The links of this chain consist of heads 3 and 4 connected at the corners by bars or posts 5, which form with said heads a skeleton or open frame. Between these bars or posts in the faces of the links spaces are provided to receive the teeth of the carrying or sprocket wheel, and as there are four of these spaces, one on each side of the link, it is evident that either face of the link may be presented to the surface of the wheel. A head 3 is provided with a loop or staple 6 to receive a hook 7 on the end of the adjoining link, and the head 4 is provided with a corresponding hook 7 to enter the loop of the link contiguous thereto. The hook 7 is preferably in a plane substantially at right angles to that of the loop 6.

In Fig. 3 an eye 8 is swiveled in the head 3 and free to revolve therein to allow the links to adjust themselves to the surfaces on which they are working. In Fig. 5 I have illustrated this form of chain in use. The bars 5 project beyond the heads of the links and form ways 9 which receive the guides 10 provided on the brackets 11. The brackets may be supported in any suitable way as by the bar 12. A chain of this construction is capable of use wherever it is desired to operate a power transmitting means at an angle, or where the sprocket wheels are in different planes with respect to the faces of the links. Each link will turn on its swivel and accommodate itself to the different surfaces on which it is working, and the different angles in which the power is applied or transmitted.

I claim as my invention:

1. A power transmitting chain comprising a series of box links having a hook at one end and an eye at the other in planes substantially at right angles to one another.

2. A power transmitting chain comprising heads and bars connecting them at the corners, one of said heads having a loop or eye and the other head a hook, for the purpose specified.

3. A power transmitting chain comprising a skeleton link having a hook at one end and a swiveled eye at the other end, substantially as described.

4. A power transmitting chain comprising heads 3 and 4, and posts 5 connecting said heads at the corners of the links and integral therewith and spaced from one another to form a skeleton link, one of said heads having a loop and the other head a hook, for the purpose specified.

5. A sprocket chain, comprising box links, having openings on each face to receive the carrying wheels' teeth, and a connecting means at the ends of the links.

6. A power transmitting chain, comprising skeleton box links having open faces to receive the teeth of the carrying wheels, and guide ways formed in said faces.

7. A power transmitting chain composed of pivotally connected links each comprising two heads, and bars connecting the corners of said heads respectively, whereby an opening is formed on each side of the link to receive a sprocket wheel tooth.

8. A power transmitting chain composed of pivotally connected links each comprising two heads, and four bars connecting said heads at the corners and forming four openings in the link to receive a sprocket wheel tooth, substantially as described.

9. The power transmitting chain consisting of a series of pivotally connected box links having four equal openings, one in each side of the link, each opening being adapted to receive a sprocket wheel tooth and the pivot at one end of a link being at right angles substantially to the pivot at the other end of the link.

10. A power transmitting chain consisting of a series of box links having openings in their sides to receive the sprocket wheel teeth, said links being pivotally connected to one another and the pivot at one end of a tooth being substantially at right angles to the pivot at the other end, whereby the chain is adapted to work on wheels operating in planes at an angle to one another, substantially as described.

11. A power transmitting chain comprising box links having open faces to receive the carrying wheel teeth and depressions or recesses in said faces forming guide ways, substantially as described.

12. The combination, with a polygonal sprocket wheel having a series of teeth, of a power transmitting chain composed of a series of box links having open sides to receive the teeth of said wheel, the pivots at the opposite ends of each of said links being at right angles to one another, substantially as described.

13. A power transmitting chain comprising box links having open faces to receive the teeth of the carrying wheels and said links having suitable guide ways.

14. A power transmitting chain comprising box links having four faces with openings therein to receive the teeth of a sprocket wheel, and a universal joint connection provided between said links.

15. A power transmitting chain comprising a series of links having openings in planes at angles to one another to receive the teeth of sprocket wheels in different planes and universal joint connections between said links.

In witness whereof, I have hereunto set my hand this 7th day of October 1905.

CHARLES O. WYMAN.

Witnesses:
G. H. WYMAN,
WILL. O. BLANCHARD.